T. A. E. BELT.
ELECTRICAL SYSTEM OF DISTRIBUTION.
APPLICATION FILED APR. 16, 1920.
1,362,593. Patented Dec. 21, 1920.
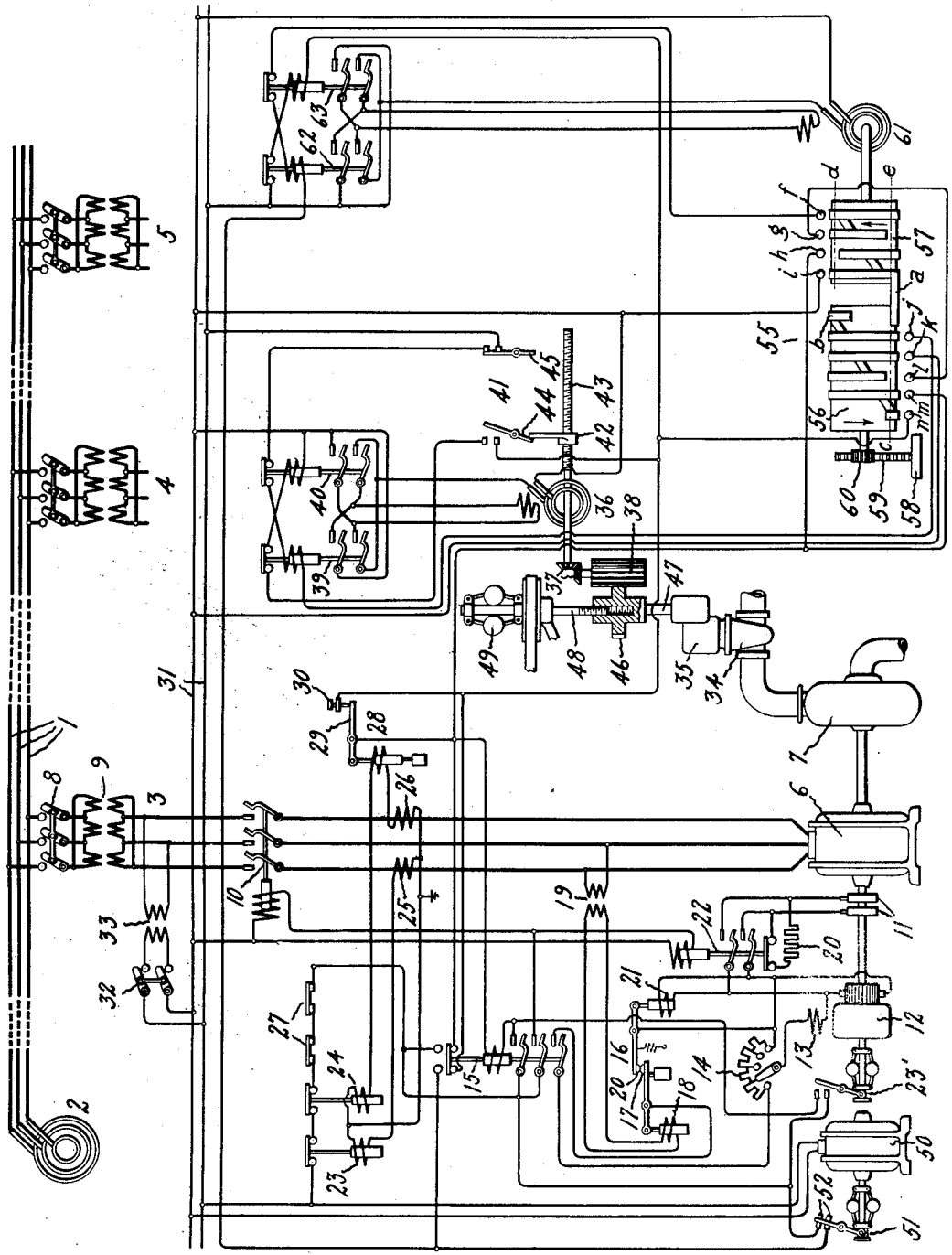
Inventor:
Thomas A.E. Belt,
by Albert G. Davis
His Attorney.

UNITED STATES PATENT OFFICE.

THOMAS A. E. BELT, OF SCHENECTADY, NEW YORK, ASSIGNOR TO GENERAL ELECTRIC COMPANY, A CORPORATION OF NEW YORK.

ELECTRICAL SYSTEM OF DISTRIBUTION.

1,362,593.  Specification of Letters Patent.  Patented Dec. 21, 1920.

Application filed April 16, 1920. Serial No. 374,333.

*To all whom it may concern:*

Be it known that I, THOMAS A. E. BELT, a citizen of the United States, residing at Schenectady, county of Schenectady, State of New York, have invented certain new and useful Improvements in Electrical Systems of Distribution, of which the following is a specification.

My invention relates to an electrical system of distribution and more particularly to automatic prime mover dynamo plants and their operation. My invention finds its greatest field of utility in the automatic operation of hydro-electric plants.

My invention is an improvement upon the system shown in the application of C. W. Place, Serial No. 366,596, filed March 17, 1920, and assigned to the same assignee as this application. In said application, a system of electrical distribution is disclosed in which a plurality of prime mover dynamo plants are adapted to be automatically started up in response to a predetermined condition and connected to a common distribution circuit in a sequence determined by a condition of the plants, such as the relative head of water available at the various plants for driving the prime movers.

One object of my invention is to provide new and improved apparatus for determining the sequence in which the automatic prime mover dynamo plants are started up and connected to the distribution circuit.

In accordance with my invention I provide each automatic plant with a timing device which comprises two coöperating movable contacts which control the starting up of the plant. These contacts are normally out of engagement with each other. One of these contacts is adapted to be positioned relative to the other in accordance with variations in a predetermined condition of the plant, such as the head of water available for driving the prime mover thereat, and the other contact is adapted to be moved into engagement with the first mentioned contact in response to a predetermined condition to complete the starting circuit of the plant.

With this arrangement, it will be observed that the distance between the two contacts is varied in accordance with the variations in the predetermined condition of the plant while it is shut down. Therefore, whenever the predetermined condition occurs, which causes the automatic plants to start up, the starting circuits of the plants are closed in a sequence determined by the relative condition of the plants, and the plant, in which the two contacts of the timing device are nearest together, is the first one started up and connected to the distribution circuit.

My invention will be better understood from the following description taken in connection with the accompanying drawing and its scope will be pointed out in the appended claims.

Referring to the drawing, 1 represents an alternating current distribution circuit which is adapted to be supplied with electrical energy from a plurality of prime mover dynamo plants, four of which I have indicated by the numerals 2, 3, 4, and 5. It will be assumed that the plant 2 is a manually controlled plant which supplies energy to the distribution circuit at all times, and that the plants 3, 4 and 5 are automatic plants which are adapted to supply energy to the distribution circuit under certain predetermined conditions.

Each automatic plant may be provided with any suitable type of prime mover which can be automatically started and stopped in response to predetermined conditions and with any suitable apparatus and connections for automatically connecting the generator to the distribution circuit, pulling it into step, and causing it to carry a portion of the load on the distribution circuit. In order to simplify the disclosure, I have shown in detail only the particular apparatus employed and the connections used in the automatic plant 3. It will be assumed that the apparatus and connections of the automatic plants 4 and 5 are the same as shown in connection with plant 3.

The particular apparatus which I have shown as being employed in the plant 3 comprises an alternating current generator 6 driven by a waterwheel 7 and adapted to supply power to the distribution circuit 1 by means of the disconnecting switch 8, transformers 9 and contactor 10. For the purpose of supplying direct current to the field winding of the generator, I provide an exciter 12 which is driven by the waterwheel 7. The exciter 12 is provided with a shunt field winding 13, which has connected in series therewith a portion of the adjustable resistance 14. This portion of the resistance is adapted to be shunted through a contact of the contactor 15 and contacts of a voltage regulator 16 of the vibratory type. This regulator comprises a floating contact 17 which is actuated by an electromagnet consisting of a coil 18 connected across one phase of the generator 6 by means of a transformer 19 and a vibrating contact 20 which is actuated by an electromagnet comprising a coil 21 connected across the terminals of the exciter 12. In order to supply the field winding of the generator 6 with exciting current at the proper instant during the starting up of the plant, I provide a contactor 22 which, in its open position, connects the slip rings 11 together through a discharge resistance 20 and in its closed position opens this circuit and connects the slip rings 11 to the terminals of the exciter 12.

A centrifugally operated switch 23' is connected to the rotating member of the generator 6 and is arranged to complete a circuit for the contactor 15 when the speed of the generator reaches a predetermined value. The contactor 15, in addition to controlling the shunt circuit around the resistance 14, also controls the circuits of contactors 10 and 22 so that when the contactor 15 closes, the generator is connected to the distribution circuit and current is supplied to the field winding of the generator to pull it into step.

The circuit of the contactor 15 is also controlled by the relays 23 and 24 and the thermostats 27. The relays 23 and 24 are time limit relays which are connected to different phases of the generator 6 by means of current transformers 25 and 26. The thermostats 27 are mounted on different parts of the apparatus and are adapted to open the circuit of the contactor 15 when the temperature of the apparatus exceeds a predetermined value.

In order to shut the plant down when the output decreases below a predetermined value it is provided with any suitable load responsive device which is adapted to control a circuit which shuts the plant down. The particular device which I have shown is a contact making ammeter 28, which is connected in series with the winding of relay 24. The movable contact 29 of the ammeter is arranged to remain out of engagement with a stationary contact 30 as long as the current in the lead, in which the current transformer 26 is connected, exceeds a predetermined value. The engagement of contacts 29 and 30 causes the plant to shut down in a manner hereinafter described.

A control circuit 31 for supplying energy to the control apparatus is adapted to be normally supplied with energy from the distribution circuit 1 by means of disconnecting switches 8 and 32 and the transformers 9 and 33.

The waterwheel may be provided with any suitable means whereby the amount of water supplied thereto, from a source not shown, may be automatically varied in response to predetermined conditions for starting and stopping the waterwheel and may be automatically varied to maintain the speed of the waterwheel constant while it is in operation. For accomplishing these results I have shown a remote control governor 35 which may be of any suitable type for controlling the position of a gate 34 in the penstock connecting the waterwheel to the source. The particular governor diagrammatically shown in the drawing is of the well known type in which the length of the governor shaft is adapted to be changed to start the waterwheel and to be changed in the reversed order to shut down the waterwheel.

The particular means diagrammatically shown in the drawing for varying the length of the governor shaft comprises a motor 36 connected by means of bevel gears 37 to the pinion 38. The pinion 38 meshes with a gear 46 connected to the lower portion 47 of the governor shaft in any suitable manner, so that the gear 46 can turn thereon. The lower end of upper portion 48 of the governor shaft is threaded and engages the inner portion of the gear 46 which is also threaded. Both portions of the governor shaft are arranged in any suitable manner so that they cannot rotate, but can be moved longitudinally by the fly-balls 49 which are connected to the rotating element of the waterwheel 7. Therefore, since both portions of the governor shaft cannot rotate, it is evident that the rotation of the motor 36 in one direction will decrease the over-all length of the governor shaft, and the rotation in the other direction will increase the length. The variation in the length of the governor shaft controls the position of the gate 34 in a manner well known in the art.

The circuits of the governor motor 36 are adapted to be connected to the control circuit 31 by means of contactors 39 and 40. Contactor 39, in its closed position, completes a circuit for the motor 36 so that it rotates in a direction to change the length of the governor shaft so that the gate 34 is opened, and contactor 40, in its closed position, completes a circuit for the motor 36 so that it rotates in a direction to change the length of the governor shaft in the reverse order so that the gate 34 is closed. In order to stop the motor 36 after it has varied the length of the governor shaft the necessary amount to open or close the gate, I provide a switch 41 which controls the circuits of contactors 39 and 40. This switch 41, as shown, comprises a nut 42 which moves longitudinally along the shaft 43 of the motor 36 and which is adapted to engage the limit switch 45 to open the circuit through contactor 39 after the gate 34 has been opened a predetermined amount and to engage the limit switch 44 to open the circuit of contactor 40 when the gate 34 is closed.

The automatic plants may be arranged to start up in response to any desired condition. For the purpose of this description, I have shown the plants as being started up in response to a predetermined drop in the frequency of the distribution circuit 1 caused by the plants already connected to the distribution circuit being overloaded. For accomplishing this object, I provide, at each plant, a frequency responsive device of any suitable type. The particular device I have shown is an alternating current motor 50 of the induction type. This motor has connected thereto a centrifugally operated switch 51 which is adapted to complete a circuit through contacts 52 whenever the speed of the motor 50 drops below a predetermined value due to a drop in the frequency of the circuit 1. The completion of the circuit through contacts 52 causes the plant to start up in a manner hereinafter described.

In order to determine the sequence in which the plants are started and connected to the distribution circuit 1, I provide each plant with a timing device 55 which is adapted to vary the time required to start up and connect the plant to the distribution circuit after the predetermined drop in frequency occurs. Each timing device comprises a movable contact which is adapted to be moved into engagement with a second contact in any suitable manner to complete the starting circuit of the plant when the predetermined drop in frequency occurs. The said second contacts are adapted to be automatically adjusted relative to the first mentioned contacts in any suitable manner by variations in any desired condition of the plants, such, for example, as the amount of energy available for driving the prime movers, so the sequence in which the plants are started and connected to the distribution circuit is determined by this condition of the plants.

In the system shown in the drawing, the sequence in which the plants are started and connected to the distribution circuit is determined by the relative head of water available at the different plants, the first plant to be started and connected to the circuit being the one having the highest head.

The preferred form of timing devices 55 which I propose to use comprises two rotatable controllers 56 and 57. Each controller comprises fixed contact fingers connected to various circuits of the plant and a cylindrical drum carrying segments by means of which the various fingers are interconnected in the desired manner and in the desired sequence. Since this form of controller is well known in the art further description thereof is deemed unnecessary. The controllers 56 and 57 are so arranged with respect to each other that a segment on one is adapted to engage a segment on the other when the controllers occupy certain positions relative to each other. In the arrangement shown I accomplish this object by mounting the controllers end to end and providing the controller 57 with a segment $a$ which extends beyond the end thereof and is adapted to engage a segment $b$ on the drum 56. The position of the drum 56 is determined by the position of a float 58 which is connected to the drum by means of a rack 59 and a pinion 60. When the head of water is below a predetermined value the controller 56 occupies the position $c$. In this position it is impossible to start up the plant as will hereinafter be described. When the head of water increases above the predetermined value, the drum controller 56 is rotated in a direction indicated by the arrow on the drum thus bringing the segment $b$ nearer the segment $a$ on the drum controller 57.

The drum controller 57 is rotated by a motor 61 which is adapted to be connected to the control circuit 31 by means of contactors 62 and 63. These contactors are arranged to close the circuits of motor 61 in such a manner as to rotate the motor in opposite directions. While the plant is shut down the drum controller 57 is in the position $d$. When it is desired to start the plant, the contactor 62 is closed to complete a circuit for the motor 61 to rotate the drum controller 57 from position $d$ to position $e$ in the direction indicated by the arrow. During this movement, which is designed to take several minutes, the segment $a$ engages the segment $b$ to complete the starting circuit of the plant, and remains in engagement therewith for a sufficient length of time to allow the plant to be started up and connected to the distribution circuit.

The operation of the system shown is as follows: Let it be assumed that the distribution circuit 1 is being supplied with energy from the manually controlled plant 2, and that the automatic plants 3, 4 and 5 are shut down. Also let it be assumed that the disconnecting switches 8 and 32 in all of the automatic plants are closed and that the head of water for driving the prime mover of each plant is such that the drum controller 56 therein is in some other position than position $c$. Under these conditions, the control circuit 31 in each plant is energized and the motor 50 therein is in operation. As long as the frequency of the distribution circuit 1 remains above a predetermined value, the centrifugally operated switch 51 in each plant remains out of engagement with its respective contacts 52.

When the frequency of the distribution circuit 1 drops below a predetermined value which indicates that there is an excessive load on the plants connected to the distribution circuit, the centrifugally operated switch 51 in each automatic plant engages its contacts 52 and completes a circuit from the lower conductor of the control circuit 31 through contacts of relays 23 and 24, thermostats 27, contacts 52 of the centrifugally operated switch 51, contactor 62, upper contacts of contactor 63, contact fingers $f$ and $g$ and segments of the controller 57, contact fingers $l$ and $k$ and segments of the controller 56 to the upper conductor of the control circuit 31. The closing of this circuit in each of the automatic plants 3, 4 and 5 causes the contactor 62 therein to close and complete the circuits of the motor 61. All of these motors begin operating at the same time to move the controllers 57 from position $d$ to position $e$ in the direction indicated by the arrow thereon. As stated above the segment $a$ of the controller 57 in the plant having the highest head of water is the first one to engage a segment $b$. This engagement of segments $a$ and $b$ completes the starting circuit of the plant from the lower conductor of the control circuit 31 through limit switch 45, upper interlock contact of contactor 40, contactor 39, contact finger $j$ and segment $b$ of controller 56, segment $a$ and contact finger $i$ of controller 57 to the upper conductor of the control circuit 31. Contactor 39 closes and completes a circuit for motor 36 so that it rotates in the proper direction to change the length of the governor shaft. Segment $b$ is of sufficient length so that segment $a$ does not move out of engagement therewith until after the motor 36 has changed the length of the governor shaft the desired amount and the limit switch 45 has been opened. The operation of the motor 36 is also arranged so that the limit switch 45 is not opened until after the plant has had time to be started up and connected to the distribution circuit 1.

The change in length of the governor shaft is in the proper direction to cause the gate 34 to be gradually opened in a manner well known in the art, so that the waterwheel 7 starts to revolve. When a speed near the synchronous speed of the generator 6 is reached the centrifugally operated switch 23' closes and completes a circuit from the lower conductor of the control circuit 31 through contacts of the relays 23 and 24, thermostats 27, contact of the centrifugally operated switch 23', contactor 15, contact fingers $h$ and $i$ and segments of the controller 57 to the upper conductor of the control circuit 31. Contactor 15 closes and completes a locking circuit for itself which is independent of the contacts of the centrifugally operated switch 23'. The purpose of this locking circuit is to prevent the contactor from opening and shutting down the plant in case the frequency of the distribution circuit 1 falls sufficiently to cause the centrifugally operated switch 23' to open.

The contactor 15 also closes the circuits of contactors 10 and 22. Contactor 10 closes, and connects the generator 6 to the distribution circuit 1 through the transformers 9 and the disconnecting switch 8. The contactor 22 closes, and connects the exciter 12 to the field winding of the generator 6. The closing of contactor 15 also connects the contacts of the voltage regulator 16 in multiple with the adjustable resistance 14 thereby causing the exciter voltage to build up and excite the field winding of the generator. With excitation applied to its field winding, the generator pulls into step.

The generator 6 of the plant having the highest head of water is now in step carrying its share of the load on the circuit 1 through the action of the waterwheel governor 35 and maintaining the desired voltage by means of the voltage regulator 16.

As soon as the first plant is connected to the distribution circuit 1, the frequency thereof is restored to normal unless the demand still exceeds the total capacity of all the plants connected thereto, under which condition additional plants are connected to the distribution circuit 1.

When normal frequency is restored the movable contact of the centrifugally operated switch 51 in each automatic station moves out of engagement with its respective contacts 52. The opening of the circuits through the various contacts 52 deënergizes the contactors 62 in all of the plants except those connected to and supplying energy to the distribution circuit.

The opening of the contactor 62 in each of the stations not connected to the distribution circuit completes a circuit for the contactor 63 therein through the contacts 29 and 30 of the contact making ammeter 28, which are in engagement as the generator is not supplying energy to the distribution circuit 1, and fingers $h$ and $i$ and segments of the controller 57. Contactor 63 closes and completes a circuit for the motor 61 so as to rotate the controller 57 in the direction opposite from that shown by the arrow to turn the controller to the off position $d$. When the controller 57 reaches the off position $d$, the circuit of the contactor 63 is opened by the finger $h$ moving out of engagement with the segment of the controller. The opening of the contactor 63 disconnects the motor 61 from the control circuit 31. As soon as the segment $a$ on the drum controller 57 disengages segment $b$, while the controller 57 is being restored to its normal position, the circuit of contactor 39 is opened. Contactor 39 opens and completes a circuit for contactor 40. Contactor 40 closes and completes a circuit for the motor 36 so that it rotates to change the length of the governor shaft to shut the gate 34. As soon as the length of governor shaft has been changed the necessary amount to close the gate 34, the limit switch 44 is operated to open the circuit of contactor 40.

In each of the automatic plants connected to the distribution circuit 1, the opening of the circuit through contacts 52 does not cause the contactor 62 therein to open, because the contactor 15, in its closed position, completes a circuit around the contacts 52. Controller 57 in each of these plants, therefore, continues to rotate until it reaches position e at which time the circuit of contactor 62 is opened by contact finger g moving out of engagement with the segment of the controller 57. As above stated, the movement of the controller 57 from position d to position e takes several minutes, and therefore the plant associated therewith is connected to the distribution circuit before position e is reached, and the circuit of contactor 63 is not closed through contacts of the ammeter 28 when contactor 62 opens.

Thus, it will be observed that all of the automatic plants except those supplying energy to the distribution circuit are automatically shut down when the frequency of the distribution circuit 1 is restored to its normal value. After an automatic plant has been connected to the distribution circuit it remains connected thereto until certain predetermined conditions cause the plant to shut down.

In the arrangement shown in the drawing, each plant is adapted to shut down on light load. This is accomplished by the movable contact 29 of the contact-making ammeter, which is held out of engagement with contact 30 as long as the output of the generator 6 exceeds a predetermined value, engaging the contact 30 when the output of the generator 6 drops below the predetermined value. This engagement of contacts 29 and 30 completes the circuit of the contactors 40 and 63 thereby causing the plant to shut down in the manner above described. When the controller 57 reaches the off position d the locking circuit of contactor 15 is opened by finger h of the drum controller 57, whereupon the circuits of contactors 10 and 22 are broken. Contactor 10 opens and disconnects the generator 6 from the distribution circuit, and contactor 22 opens and disconnects the field winding of the generator from the exciter 12.

The automatic plants are also arranged to shut down when the water in the sources supplying the waterwheels is low. This is accomplished by having the circuit of contactor 63 completed through segments and contact fingers m and n of the controller 56 when the controller is in the low water position c. Also, in order to prevent the plant starting up when the water is low, the circuit of contactor 62 extends through contact finger l and a segment of the controller 56, which are out of engagement with each other when the controller is in the low water position c.

Each station is also arranged to automatically shut down in case the output thereof exceeds a predetermined amount or the temperature of the apparatus exceeds a predetermined value. This is accomplished by means of the overload relays 23 and 24 and the thermostats 27 which are adapted to open the circuit of contactor 15. The opening of contactor 15 opens the circuits of contactors 10 and 22 thereby disconnecting the generator 6 from the distribution circuit 1, and opening the field circuit thereof. The opening of contactor 15 also closes the circuits of the contacts 40 and 63 to shut down the plant in the manner above described.

It is apparent that various modifications may be made without departing from the spirit and scope of my invention, and, therefore, I do not desire to be limited to the particular arrangement herein shown, but seek to cover in the appended claims all such alterations and modifications.

What I claim as new and desire to secure by Letters Patent of the United States, is:—

1. In a system of electrical distribution, a distribution circuit, a prime mover dynamo plant adapted to be automatically started up and connected to said distribution circuit to supply energy thereto, and a timing device controlling the starting circuit of said plant, said timing device comprising two normally separated contacts, means controlled by a condition of said plant for actuating one of said contacts to vary the distance between said contacts and means responsive to a predetermined condition for actuating the other of said contacts to bring said contacts into engagement with each other to start up the plant.

2. In a system of electrical distribution, a distribution circuit, a prime mover dynamo plant adapted to be automatically started up and connected to said distribution circuit to supply energy thereto, a source of energy for supplying fluid to the prime mover of said plant, and a timing device controlling the starting circuit of said plant, said timing device comprising two normally separated contacts, means controlled by a condition of said source for actuating one of said contacts to vary the distance between said contacts, and means responsive to a predetermined condition of said circuit for actuating the other of said contacts to bring said contacts into engagement with each other to start up the plant.

3. In a system of electrical distribution, a distribution circuit, a prime mover dynamo plant adapted to be automatically started up and connected to said distribution circuit to supply energy thereto, a variable source of fluid supply for the prime mover of said plant, and a timing device controlling the starting circuit of said plant, said timing device comprising two normally separated contacts, a drum carrying one of said contacts, a float adapted to rotate said drum, a second drum carrying the other of said contacts, and means responsive to a predetermined condition of said circuit for rotating said second drum to bring the contact carried thereby into engagement with the contact carried by said first mentioned drum.

4. In a system of electrical distribution, a distribution circuit, a prime mover dynamo plant adapted to be automatically started up and connected to said distribution circuit to supply energy thereto, a variable source of fluid supply for the prime mover of said plant, and a timing device controlling the starting circuit of said plant, said timing device comprising two normally separated contacts, a drum carrying one of said contacts, a float adapted to rotate said drum, a second drum carrying the other of said contacts, a motor for rotating said second drum to bring the contact carried thereby into engagement with the contact carried by said first mentioned drum, and a frequency responsive device connected to said circuit and adapted to control the circuits of said motor.

In witness whereof, I have hereunto set my hand this 14th day of April, 1920.

THOMAS A. E. BELT.